United States Patent Office 3,005,761
Patented Oct. 24, 1961

3,005,761
PROCESS FOR THE PREPARATION OF COKE WITH HIGHLY MODERATING PROPERTIES AND FOR THE USE THEREOF IN NUCLEAR REACTORS
Willem J. D. van Dijck, The Hague, Netherlands, assignor to Shell Oil Company, a corporation of Delaware
No Drawing. Filed Aug. 30, 1956, Ser. No. 606,989
Claims priority, application Netherlands Aug. 31, 1955
3 Claims. (Cl. 204—154.2)

The invention relates to a process for preparing a new carbon product which owing to the presence of a small deuterium content has particularly good properties for use in nuclear reactors as a moderator, reflector or heat-carrier, and for the use of this product for the said purpose.

It is known that in operating nuclear reactors there are usually present in the reaction zone (viz. the zone in which the nuclear reaction occurs), in addition to the fissile material, so-called moderators, which substances are used to reduce the speed of the rapid neutrons formed in the fission process, so that they change into slow or thermal neutrons; moreover, these substances may also act as a coolant.

The activity of these moderators, for which heavy water, beryllium and beryllium compounds (particularly the oxide and the carbide) and also carbon are suitable, varies greatly, according to the substance used. Although in this respect carbon is less efficient than other moderators such as beryllium, beryllium compounds and heavy water, carbon, especially carbon with a high density, such as graphite, is nevertheless frequently used as a moderator in nuclear reactors. This is not only due to the fact that carbon, as compared with substances such as heavy water and beryllium compounds, is much cheaper, but also to the fact that, unlike the beryllium compounds, it is not poisonous, and, unlike heavy water, is a solid substance with an extremely small vapour tension. As a result it is possible, on the one hand, to use the moderator as material of construction and on the other hand to combine high temperatures with normal low pressures. At the high temperatures at which energy-producing nuclear reactors (power reactors) are operated, the high pressures occurring in the case of a liquid moderator with a high vapour tension, e.g. heavy water, are unnecessary when a solid moderator with a low vapour tension is used, which results, of course, in a very considerable saving in the cost of apparatus, and also enables the risks connected with operating at high pressures in nuclear reactors to be eliminated. In addition, carbon has a good resistance to very high temperatures and to radioactive radiation, and is readily reduced to a finely-divided form, suitable for fluidization, so that it is possible to effect its transport in the nuclear reactor by means of the fluid technique.

The invention now provides a process for the preparation of a carbon product of which the moderating effect is considerably greater than that of the most active carbon-base moderator, viz. graphite, which has hitherto been available.

The process according to the invention consists in that deuterated products obtained by deuterating heavy, particularly polycyclic, aromatic hydrocarbons, are carbonized by the use of any of the methods known per se for the preparation of carbon from material rich in carbon. By heavy hydrocarbons are here understood those of which the vapour pressure remains considerably below the operating pressure at the temperature at which carbonization is carried out.

The deuterated aromatic starting material used in the present process may be obtained by deuterating, by means of the so-called trickle technique as described and claimed in Willem J. D. van Dijck's and Hendrik Kloosterziel's patent application, Serial No. 606,988 filed August 30, 1956, now abandoned, simultaneously with the present application, normally liquid or solid aromatic hydrocarbons, particularly such as have more than one ring, e.g. anthracene, phenanthrene and their higher homologues and the like, or mixtures wholly or predominantly consisting thereof, such as heavy refined tar-oil fractions, aromatic extracts of heavy mineral oil products, and the like. In this process the hydrocarbon material is allowed to flow down in a liquid state in the form of a thin layer at elevated temperature and pressure over a fixed catalyst arranged in a reaction zone, which catalyst promotes the exchange of hydrogen with deuterium, while passing through at the same time in an upward direction deuterium or a gas containing or yielding deuterium.

It has been found that in the process according to the invention it is advisable to start from deuterated material in which the atomic ratio of deuterium to carbon is greater than 1:5, but less than 1:1. If the original starting material contains one or more short side chains per aromatic ring, e.g. such as have 1 or 2 carbon atoms, it may be desirable to carry out a pretreatment before the actual carbonization, by means of which pretreatment these side chains are wholly or partly split off; this can be effected by heating the material at a temperature which is below the decomposition point, e.g. at 200° C. to 400° C., in the presence of a know dealkylating catalyst.

The deuterated starting material can be carbonized in the same way as is usual for carbonizing or coking of material rich in carbon, such as heavy aromatic hydrocarbons, in order to prepare carbon. In principle any method known per se for the preparation of carbon black and of carbon powder which is suitable for fluid techniques may be used for the purpose. Although to this end those processes are also suitable in which the carbon is formed by incomplete combustion of the starting material, the purely thermal processes are preferred in which the carbonization or coking thus is effected by heating the material in the absence of oxygen-containing gases, at temperatures above the decomposition point of the material to be converted.

As in the preparation of carbon black, the temperatures used for carbonization may also vary greatly in the present process according to the nature of the material to be converted, the duration of heating and the other reaction conditions, such as the pressure, the presence or absence of a carrier gas, and the like. In general these temperatures lie between approximately 500° C. and 1000° C., although higher or lower temperatures may sometimes also be suitable.

In the thermal treatment to which the starting material is subjected in addition to the desired carbon product, gaseous decomposition products are formed which contain deuterium and deuterated light hydrocarbons, and have to be withdrawn from the reaction zone as they are formed.

The said gases are valuable products which, as has been found, may be advantageously used as an additional source of deuterium in preparing the deuterated initial material employed as starting material in the present process.

The carbon products prepared according to the invention are non-graphitic and have a small deuterium content which is so firmly bound to the carbon that it is not reduced, or scarcely at all, even when heated for a long period at high temperatures. This deuterium content, which according to the reaction conditions used in carbonization may vary, for example, from 0.5 to 5% by weight, is generally lower according as the carbonization temperature was higher.

Owing to this deuterium content the carbon product obtained according to the invention have a moderating effect when used in nuclear reactors, which is considerably superior to that of carbon derived from non-deuterated hydrocarbon material, even carbon with a high density, such as graphite.

Thus, for instance, it was found that a carbon which was prepared from deuterated heavy aromatics by carbonization at a temperature of approximately 1000° C. and had a deuterium content of approximately 1.4% by weight and a density of approximately 1.8, had a moderating effect which, calculated per unit of volume, was 30% higher than that of a carbon prepared from non-deuterated material under the same conditions. In the case of a carbon obtained from deuterated aromatics at a lower temperature (500° C. to 600° C.) with a deuterium content of approximately 5% by weight, the moderating effect was even more than twice that of graphite.

As compared to the preparation of graphitic carbon, starting from a less dense carbon, for which a very prolonged heating at very high temperatures, e.g. from 1800° C. to 2000° C., is required, the present process has the great advantage in addition to the considerably greater moderating properties of the carbon obtained thereby, that much lower temperatures, which do not generally exceed 1000° C., and a short period of heating are sufficient.

The carbon prepared according to the invention is very suitable for use in nuclear reactors in which the fissile material and the moderator are arranged in the reaction zone in a stationary condition and the heat generated therein is drawn off by a fluid. The fissile material, e.g. uranium oxide or uranium carbide, the carbon and any thorium carbide or other fertile material (i.e. a substance which can be converted into a fissile material by the effect of neutrons) may in this case be suitably present as a homogeneous or virtually homogeneous mixture in the form of a ceramic material with open porosity.

The carbon products according to the invention may also be used in nuclear reactors of the type in which a granular mixture of which all or virtually all the individual particles contain both fissile material and a heat-carrier acting at the same time as a moderator, which particles are preferably spherical and have an open porosity and a diameter lying between approximately 50 and 300 $\mu$, is cycled through the reaction zone and a cooler situated outside it, at least a part of the transport of the mixture to and through the cooler being effected in a fluid (fluidized) state.

The carbon prepared according to the invention may not only be used as a moderator but also as material for the reflector mantle which is placed round the reaction zone in nuclear reactors in order to reflect a part of the neutrons leaving the reaction zone.

I claim as my invention:

1. Process for the production of a moderator for nuclear reactors which comprises contacting a polycyclic aromatic oil with a gas rich in deuterium in the presence of a hydrogenation catalyst for a time to incorporate from about 1/5 to 1 deuterium atoms per carbon atom by hydrogen-deuterium exchange, then thermally decomposing the resulting product in the liquid phase to produce a solid non-graphitic coke and heating said coke for a time and a temperature between about 500° C. and 1000° C. to reduce the concentration of deuterium to between 0.5 and 5% by weight.

2. A solid non-graphitic coke containing from 0.5 to 5% by weight of firmly bound deuterium.

3. Process for the production of a moderator which comprises countercurrently contacting in an exchange zone a polynuclear aromatic hydrocarbon with gas rich in deuterium in the presence of a hydrogen-deuterium exchange catalyst until the atomic ratio of deuterium to carbon is at least 1:5 but less than 1:1, pyrolyzing the resulting deuterated aromatic hydrocarbon at a temperature between about 500 and 1000° C. under a pressure sufficient to maintain the deuterated aromatic hydrocarbon in the liquid phase for a time to produce a cracked gas rich in deuterium and a coke containing between 0.5 and 5% deuterium and passing said gas rich in deuterium to said exchange zone as aforesaid.

References Cited in the file of this patent

UNITED STATES PATENTS

| 2,690,382 | Joris | Sept. 28, 1954 |
| 2,708,656 | Fermi et al. | May 17, 1955 |
| 2,736,696 | Wigner et al. | Feb. 28, 1956 |
| 2,779,664 | Sweitzer | Jan. 29, 1957 |

OTHER REFERENCES

NBS–4611, USAEC Report dated May 26, 1956, pages 47–52, 64.

The Reactor Handbook (AECD–3647), Vol. 3, published by USAEC, February 1955, pages 6–7.

Glasstone, Principles of Nuclear Reactor Engineering, D. Van Nostrand Co. (1955); page 17.

International Conference on the Peaceful Uses of Atomic Energy, August 8–20, 1955; published by United Nations, New York; Vol. 8, page 479.

Encyclopedia of Chemical Technology, Vol. 3, the Interscience Encyclopedia, Inc. New York (1949); pages 52, 80–83. Copy in Scientific Library.